United States Patent [19]

Reese

[11] Patent Number: 5,333,837
[45] Date of Patent: Aug. 2, 1994

[54] VALVE PLUG

[75] Inventor: Michael R. Reese, Humble, Tex.

[73] Assignee: MRGR Plugs, Inc., Humble, Tex.

[21] Appl. No.: 886,684

[22] Filed: May 20, 1992

Related U.S. Application Data

[63] Continuation of Ser. No. 662,566, Feb. 28, 1991, abandoned.

[51] Int. Cl.⁵ .............. F16K 31/50; F16K 51/00
[52] U.S. Cl. ................. 251/216; 251/351
[58] Field of Search ............... 4/295; 137/296, 312, 137/319, 320; 251/215, 216, 217, 218, 339, 351; 411/411

[56] References Cited

U.S. PATENT DOCUMENTS

| | | | |
|---|---|---|---|
| 8,772 | 6/1879 | Shaw | 251/216 |
| 385,256 | 6/1888 | Eggers | 251/216 |
| 409,031 | 8/1889 | Forniraseo | 251/216 |
| 863,953 | 8/1907 | Tribbey | 251/216 |
| 1,078,584 | 11/1913 | Jones | 251/216 |
| 1,519,231 | 12/1924 | Benjamin | 251/216 |
| 1,690,183 | 11/1928 | Stoughton | 251/216 |
| 2,000,206 | 5/1935 | Yozewitch | 4/295 |
| 2,496,030 | 1/1950 | Winey | 251/216 |
| 3,175,850 | 3/1965 | Reese | 411/411 |
| 3,422,679 | 1/1969 | McGowan et al. | 251/351 |
| 3,473,781 | 10/1969 | Abbott et al. | 251/216 |
| 3,578,285 | 5/1971 | Carlton | 251/351 |
| 4,083,377 | 4/1978 | Luckenbill | 137/296 |
| 4,470,577 | 9/1984 | Warwick | 251/216 |
| 4,487,392 | 12/1984 | Eckenrode, Jr. | 251/216 |
| 4,718,636 | 1/1988 | Briet | 251/216 |
| 4,986,502 | 1/1991 | Ceroke | 251/216 |

FOREIGN PATENT DOCUMENTS 412031  9/1945  Italy ..................... 251/216

Primary Examiner—George L. Walton
Attorney, Agent, or Firm—Rosenblatt & Associates

[57] ABSTRACT

This invention relates to the field of detecting leaks in valves and fluid system accumulation downstream of the valve. Specifically, the invention relates to a threaded valve plug containing a fluid expansion channel, hereinafter referred to as a "valve plug".

19 Claims, 1 Drawing Sheet

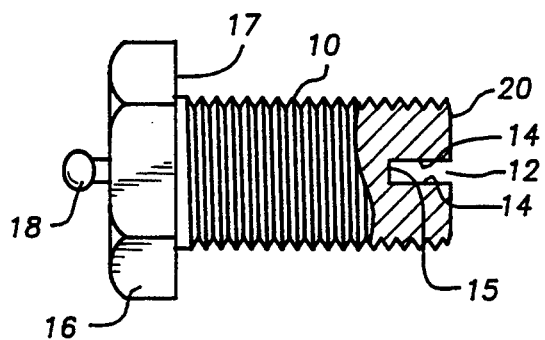
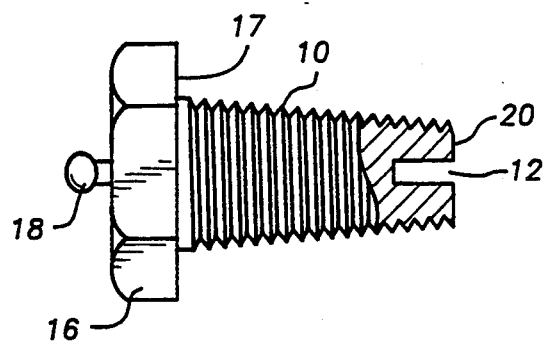
FIG. 1  FIG. 5
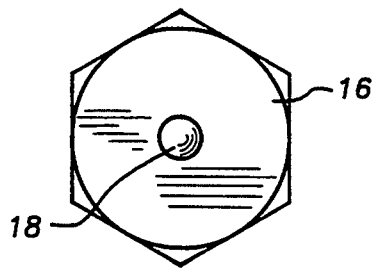
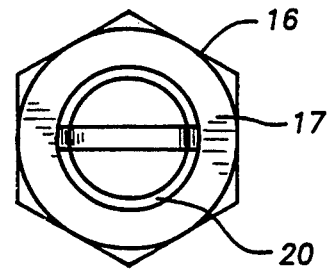
FIG. 2  FIG. 3
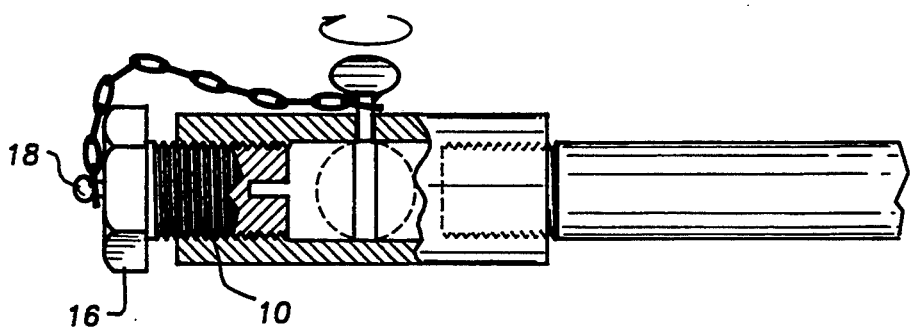
FIG. 4

VALVE PLUG

RELATED APPLICATIONS

This application is a continuation of application Ser. No. 662,566, filed on Feb. 28, 1991 now abandoned.

BACKGROUND OF THE INVENTION

1. Field of the Invention

This invention relates to the field of maintaining the integrity of and detecting leaks in fluid systems containing valves. Specifically, the invention relates to a threaded valve plug containing a fluid expansion channel, hereinafter referred to as a "valve plug".

2. Description of the Prior Art

A variety of devices have been used to seal off open-ended valves in fluid systems, thereby preventing the escape or leakage of system fluid into the environment. These devices include blind flanges, caps, and valve plugs, hereinafter referred to as "mechanical devices".

In many cases, these mechanical devices serve as redundant flow barriers or sealing mechanisms to other system components, such as valves, located upstream of these mechanical devices. In these cases, it is often desirable to ascertain whether any components upstream of the mechanical devices are leaking.

With many conventional valve plugs or caps, the plug or cap must be almost totally unscrewed to ascertain whether there is system leakage. In a pressurized fluid system, leakage can result in a pressure buildup on the front face of the valve plug. In such a case, unscrewing the valve plug or cap almost all the way can result in a pressurized expulsion of the mechanical device and an escape of system fluid ("a blowdown") through the open end of the valve which was sealed by the valve plug or cap. Such an expulsion of the mechanical device, the system fluid, or both, can result in human injury, environmental pollution, the disruption of operations associated with the fluid system, and/or fines imposed upon the owner or operator of the fluid system by government regulatory agencies. Fines may also be imposed by regulatory agencies for not having a plug or cap installed in a valve.

Many prior art valve plugs and valve caps do not provide a mechanism to ascertain whether there is fluid system leakage while simultaneously maintaining sufficient thread contact to prevent a blowdown.

Valve plugs are also used in applications where corrosive fluids are present. In such applications, it is undesirable for the valve plug to comprise rubber or other polymer-based members such as O rings. O rings eventually wear out and are particularly susceptible to deterioration in caustic or high temperature environments. Mechanical devices of the prior art such as those disclosed in U.S. Pat. Nos. 4,986,502 to Ceroke, 3,578,285 to Carlton, and 4,470,577 to Warwick disclose the use of O rings or similar sealing members. These sealing members are subject to the deterioration described above. In these devices, the sealing member, rather than the threads, provides the fluid tight seal.

Reliance upon the O ring to provide the fluid tight seal can result in leakage as well as a release of pressurized fluid when the O ring deteriorates or fails. This presents a danger of injury to workers in plants where such valve plugs are installed, as well as an environmental health hazard posed by the release of environmentally hazardous fluids.

The present invention overcomes these problems of prior art mechanical devices by not relying upon O rings or similar types of sealing members in order to form a fluid tight seal with the fluid system in which it is installed. Instead, the present invention utilizes the threads on the cylindrical body of the valve plug to form a fluid tight seal. As shown in FIGS. 1-5, the threads extend around the outer circumference of the cylindrical body. When the valve plug is completely inserted, the resulting fluid tight seal provides sufficient system integrity to prevent a blowdown in systems with pressures of less than or equal to 6,000 psi. As shown in FIG. 4, such insertion is accomplished by completely threading the valve plug into the fluid system.

The present invention is also intended for use in fluid systems where small particulate matter such as rust, grit, sludge, precipitate matter or sandblasting residue is suspended in the fluid. Prior art devices employing (1) long axial channels and/or (2) fluid flow paths with bends or turns, are unacceptable in fluid systems containing solid particulate matter because the small solid particles may either restrict the flow path or totally clog it. Such restriction or clogging will hinder the ability of these devices to indicate system leakage when partially unscrewed.

The present invention overcomes this problem by using a shallow fluid expansion channel centrally located in its face. This design is far less susceptible to the clogging or flow restriction problems of the prior art designs employing long axial channels and/or expansion channels with bends or turns.

SUMMARY OF THE INVENTION

The present invention relates to a valve plug which not only maintains its conventional use as a sealing device for an open-ended valve, but which also allows one to partially remove the valve plug to ascertain whether there is fluid accumulation between the valve and the valve plug.

The valve plug has a threaded, cylindrical body such that it can be screwed into an open-ended valve. The diameter of the valve plug body and the spacing of the threads will vary according to the diameter and thread design of the valve into which the valve plug is installed.

The end of the valve plug which is inserted into the valve has a front face which is exposed to any leaking fluid when the valve plug is installed in the valve. A fluid expansion channel is centrally located in the front face of the valve plug. The fluid expansion channel extends across the front face of the valve plug. In a preferred embodiment, the threaded cylindrical body is tapered such that the diameter is smallest at the end of the valve plug where the front face is located and gradually increases as a function of the distance from this end of the valve plug. The largest diameter occurs at the end of the cylindrical body opposite the front face.

The fluid expansion channel is defined by two side walls and a bottom surface. When the valve plug is installed in a valve, any leaking fluid will flow into the fluid expansion channel, making contact with the bottom surface of the fluid expansion channel. The fluid expansion channel is cut to a depth such that the valve plug can be partially unscrewed to the point where the bottom surface of the fluid expansion channel is exposed to the environment external of the valve, thereby allowing detection of fluid system leakage from the valve without requiring complete removal of the plug. The fluid expansion channel is also cut sufficiently shallow so as to minimize the chance of blockage or flow restriction resulting from particulate matter suspended in the fluid, and to ensure a fluid tight seal when the valve plug is completely screwed in.

Thus, a person can unscrew the valve plug of the present invention to the point where a portion of the fluid expansion channel is exposed, and ascertain whether there is fluid system leakage from the valve while maintaining sufficient thread contact between the valve plug and valve to prevent a system blowdown. In systems where the fluid is a liquid, leakage may be visually observed. In systems where the fluid is a gas, leakage may be audibly detected or detected by detection devices.

In a preferred embodiment, the end of the valve plug body opposite of the front face comprises a head. The head is shaped to facilitate the screwing and unscrewing of the valve plug into and out of the valve, respectively. In a preferred embodiment, the diameter of the cylindrical body is greatest at the end comprising the head. This tapering design facilitates the use of threads on the cylindrical body to form a fluid tight seal. In this embodiment, two to four consecutive rows of threads perform the sealing function.

At times it is necessary to remove a valve plug for system testing or maintenance. During such removal, prior art valve plugs may become misplaced. In a preferred embodiment, the valve plug comprises a mechanical linkage anchor centrally located in the head. The mechanical linkage anchor can be connected to one end of a linkage means, such as a chain, cable, wire, or rope, the other end of which is connected to the valve. Thus, when the valve plug is unscrewed from the valve, it can hang suspended by the mechanical linkage means in the vicinity of the valve, thereby greatly reducing the probability that it will be lost or misplaced.

BRIEF DESCRIPTION OF THE DRAWING

FIG. 1 is a side view of the valve plug.
FIG. 2 is a top view of the valve plug.
FIG. 3 is a bottom view of the valve plug.
FIG. 4 is a cutaway side view of the valve plug installed in an open-ended valve.
FIG. 5 is a side view of a tapered body embodiment of the valve plug.

DESCRIPTION OF THE PREFERRED EMBODIMENT

As shown in FIGS. 1 and 3, the valve plug is comprised of a threaded, cylindrical body 10 having a front face 20 at one end. In a preferred embodiment, cylindrical body 10 is threaded to the end where front face 20 is located, as shown in FIGS. 1 and 3. As shown in FIGS. 1 and 2, front face 20 is substantially planar. In a preferred embodiment, front face 20 is flat, as shown in FIG. 1. In a preferred embodiment, cylindrical body 10 is tapered having its smallest diameter at the end where front face 20 is located and having its largest diameter at the end where head 16 is located, as shown in FIG. 5.

The front face 20 comprises a fluid expansion channel 12. As shown in FIGS. 1 and 3, each end of the fluid expansion channel 12 extends to the outer periphery of the cylindrical body 10. As shown in FIG. 1, fluid expansion channel 12 is shallow and unidirectional. The term "unidirectional", as used herein and as illustrated FIGS. 1 and 4, means that fluid expansion channel 12 extends in a substantially straight line with no sharp bends and without intersecting other channels. In a preferred embodiment, fluid expansion channel 12 extends diametrically across a flat front face 20.

In a preferred embodiment, the fluid expansion channel 12 is defined by two parallel side walls 14 and a flat bottom surface 15 which is situated perpendicular to side walls 14. In one preferred embodiment, the depth of the fluid expansion channel 12 is in a range of 10/64" to 16/64". The width of the fluid expansion channel 12 may vary as a function of the valve plug diameter and the viscosity of the fluid in the system in which the valve plug is installed.

Referring to FIGS. 1 and 2, a head 16 is located or mounted on the rear end 17 of the cylindrical body 10. As shown in FIGS. 1 and 2, the head 16 may be integrally formed with the cylindrical body 10. In this preferred embodiment, the head 16 is hexagonal and is sized to be compatible with commercially available wrenches. The head 16 may also contain receptacles capable of snugly receiving an Allen wrench or a screwdriver blade or may be shaped to receive a pipe wrench.

As shown in FIGS. 1, 2 and 4, a mechanical linkage anchor 18 is centrally located in the head 16. In a preferred embodiment, the mechanical linkage anchor 18 is a rivet. Mechanical linkage members such as a chain, a rope, or a cable, can connect the mechanical linkage anchor 18 to the valve in which the valve plug is installed, thereby permitting the valve plug to hang suspended from one end of the mechanical linkage member when it is not installed in the valve.

As shown in FIG. 1 the major length of cylindrical body 10 extends from bottom surface 15 to the rear end 17 of cylindrical body 10. The minor length of cylindrical body 10 extends from the front face 20 to the bottom surface 15.

Many modifications and variations may be made in the embodiments described herein and depicted in the accompanying drawings without departing from the concept of the present invention. Accordingly, it is clearly understood that the embodiments described and illustrated herein are illustrative only and are not intended as a limitation upon the scope of the present invention.

What is claimed is:

1. A valve plug capable of providing a fluid tight seal in systems with pressure of up to 6,000 psi when said valve plug is completely threaded into the fluid system, comprising a threaded, cylindrical body having a flat front face at one end, said front face comprising a shallow fluid expansion channel centrally located in said face, and extending across said face, each end of said fluid expansion channel extending to the outer periphery of said cylindrical body, said channel extending along a minor length of said cylindrical body for allowing fluid to pass past said cylindrical body when a major length of said cylindrical body extends outside of a fluid system, said threaded cylindrical body having a sufficiently large diameter such that threads on said cylindrical body form a fluid tight seal, around the outer circumference of said cylindrical body along the major length thereof, past which fluid of the fluid system cannot flow in most positions of said cylindrical body within a fluid system.

2. The valve plug of claim 1 wherein said fluid expansion channel extends diametrically across said face.

3. The valve plug of claim 2 wherein said fluid expansion channel is defined by two side walls and a bottom surface.

4. The valve plug of claim 3 wherein the side walls of said fluid expansion channel are parallel to each other and the bottom surface of said fluid expansion channel is perpendicular to the side walls of said fluid expansion channel.

5. The valve plug of claim 1, further comprising a hexagonal head on the opposite end of said body from said front face.

6. The valve plug of claim 5, further comprising a mechanical linkage anchor centrally located in said hexagonal head.

7. A valve plug capable of providing a fluid tight seal in systems with pressure of up to 6,000 psi when said valve plug is completely threaded into the fluid system comprising:
- a. a threaded cylindrical body having a flat front face at one end, said body being threaded where said front face is located, and said threaded cylindrical body having a sufficiently large diameter such that threads on said cylindrical body form a fluid tight seal around the outer circumference of said cylindrical body along a major length thereof, past which fluid of the fluid system cannot flow in most positions of said cylindrical body within a fluid system; and
- b. a shallow, unidirectional fluid expansion channel extending diametrically across said front face, said channel extending along a minor length of said cylindrical body for allowing fluid to pass past said cylindrical when the major length of said cylindrical body extends outside of a fluid system.

8. The valve plug of claim 7 wherein said fluid expansion channel is defined by two parallel side walls and a flat bottom surface situated perpendicular to said side walls.

9. The valve plug of claim 7 further comprising a head on the end of the cylindrical body opposite the front face.

10. The valve plug of claim 9 further comprising a mechanical linkage anchor centrally located in said head.

11. A valve plug using a threaded cylindrical body having a flat front face at one end, said front face comprising a shallow fluid expansion channel centrally located in said face and extending across said face, each end of said fluid expansion channel extending to the outer periphery of said cylindrical body, said cylindrical body having a tapered design with the smallest diameter at the end where said front face is located, and the largest diameter at the end opposite from said front face, said threaded cylindrical body having a sufficiently large diameter such that threads on said cylindrical body form a fluid tight seal around the outer circumference of said cylindrical body, past which fluid of the fluid system cannot flow in most positions of said cylindrical body within a fluid system.

12. The valve plug of claim 11 wherein said fluid expansion channel extends diametrically across said face.

13. The valve plug of claim 11 wherein said fluid expansion channel is unidirectional.

14. The valve plug of claim 11 wherein the threads of said threaded cylindrical body are capable of forming a fluid tight seal when said valve plug is installed in a fluid system.

15. The valve plug of claim 11 further comprising a head located on the end of said cylindrical body opposite said fluid expansion channel.

16. A valve plug for installation in a pressurized fluid system comprising:
- a. a threaded, tapered cylindrical body having a substantially planar front face and a rear face, the diameter of said cylindrical body being smallest at the end having said front flat face and largest at the end having said rear face, said threaded cylindrical body having a sufficiently large diameter such that threads on said cylindrical body form a fluid tight seal around the outer circumference of said cylindrical body in most positions of said cylindrical body within a fluid system; and
- a shallow, unidirectional fluid expansion channel extending diametrically across said front face, said fluid expansion channel defined by two parallel side walls and a flat bottom surface, said channel allowing fluid of a fluid system to flow past said cylindrical body when a portion of said channel extends outside a fluid system.

17. The valve plug of claim 16 wherein two to four consecutive rows of threads on said threaded cylindrical body provide a fluid tight seal when said valve plug is installed in a pressurized fluid system.

18. The valve plug of claim 17 further comprising a head integrally formed with said cylindrical body and mounted on the end of said cylindrical body opposite said fluid expansion channel.

19. The valve plug of claim 16 wherein said substantially planar front face is flat.

* * * * *